(12) United States Patent
Middelfart

(10) Patent No.: US 6,732,091 B1
(45) Date of Patent: May 4, 2004

(54) METHOD AND AN APPARATUS FOR THE PROCESSING OF QUERIES TO A DATABASE

(75) Inventor: Morten Middelfart, Hjørring (DK)

(73) Assignee: Targit A/S, Hjorring (DK)

( * ) Notice: Subject to any disclaimer, the term of this patent is extended or adjusted under 35 U.S.C. 154(b) by 0 days.

(21) Appl. No.: 09/869,316

(22) PCT Filed: Apr. 13, 2000

(86) PCT No.: PCT/DK00/00181

§ 371 (c)(1),
(2), (4) Date: Jul. 24, 2001

(87) PCT Pub. No.: WO00/63798

PCT Pub. Date: Oct. 26, 2000

(30) Foreign Application Priority Data

Apr. 16, 1999 (DK) .................... PA 1999 00517

(51) Int. Cl.⁷ ............... G06F 17/30; G06F 7/00
(52) U.S. Cl. ............ 707/3; 707/5; 707/4; 707/2
(58) Field of Search ............... 707/3, 4, 5, 2

(56) References Cited

U.S. PATENT DOCUMENTS

| 5,544,355 | A | | 8/1996 | Chaudhuri et al. | 395/600 |
| 5,600,829 | A | | 2/1997 | Tsatalos et al. | 395/602 |
| 5,822,747 | A | | 10/1998 | Graefe et al. | 707/2 |
| 5,884,299 | A | | 3/1999 | Ramesh et al. | 707/2 |
| 5,930,785 | A | | 7/1999 | Lohman et al. | 707/2 |
| 5,940,818 | A | * | 8/1999 | Malloy et al. | 707/2 |
| 6,073,140 | A | * | 6/2000 | Morgan et al. | 707/203 |
| 6,385,604 | B1 | * | 5/2002 | Bakalash et al. | 707/3 |
| 6,480,836 | B1 | * | 11/2002 | Colby et al. | 707/3 |
| 6,564,212 | B2 | * | 5/2003 | Koskas | 707/3 |

FOREIGN PATENT DOCUMENTS

GB 2 330 221 4/1999

OTHER PUBLICATIONS

Chaudhuri; An Overview of Query Optimization in Relational Systems; XP–000782631; pp. 34–43.

* cited by examiner

Primary Examiner—Wayne Amsbury
Assistant Examiner—Cindy Nguyen
(74) Attorney, Agent, or Firm—Jacobson Holman PLLC

(57) ABSTRACT

An apparatus and a method of processing queries to a relational database stored on a computer readable medium including a representation of relations between sections in tables in the database. The method includes identifying tables which contain a specified type of data, generating a plurality of queries (e.g., SQL queries) by selecting at least some primary tables from the identified tables, selecting a set of tables, each table in the set being related to a primary table via N relations, and repeating this, N being varied for each repetition, until the set of tables contains the specified data, and selecting an optimal one of the generated queries.

7 Claims, 6 Drawing Sheets

METHOD AND AN APPARATUS FOR THE PROCESSING OF QUERIES TO A DATABASE

BACKGROUND OF THE INVENTION

1. Field of the Invention

The present invention relates to a method for the processing of queries to a database stored on a computer readable medium, said computer readable medium comprising a representation of relations between sections in tables in the database, said method comprising identification of tables which in combination with other tables contain a specified type of data.

More specifically, the invention relates to optimization of queries to a database. Optimization of queries typically comprises generation of a series of so-called semantically identical solutions, each of which gives rise to the same reply from a database. Of the semantically identical solutions (also called solution candidates) the query or queries are selected which are optimal in a given respect, e.g. optimal in the respect that the query can be answered most quickly.

2. Description of the Related Art

Generally, two main groups of database applications exist. A first group is denoted On-Line Transaction Processing or OLTP applications. The aim of these applications is to handle different aspects of transactions, that is: input, output, storage, and processing of individual transactions. A database supporting an OLTP application is typically tailored to provide a good performance in respect of providing fast input/output response times. Typically, this is obtained by a database that is strongly normalised, that is redundancies in the database are removed. OLTP applications are for instance used in accounting systems, inventory and production management systems for solving operational problems.

A second group is denoted On-Line Analytical Processing (OLAP) applications. The aim of these applications is to provide a response to a query only. A database supporting an OLAP application is typically tailored to provide a good performance in respect of providing fast response times to different types of requests involving multiple transactions. Thus, since requests typically involve different types of more or less time consuming calculations e.g. summations, differences, counts, averages, etc. on large data amounts, it is convenient to store pre-calculated data which can subsequently be retrieved for providing such a fast response to a request. Therefore such a database is special in that it comprises data that are redundant to a high degree. In practise this means that the same information can be requested in different ways, e.g. involving a different set of tables in a database. OLAP applications are for instance used in management information systems providing a fast overview of large amounts of data e.g. across different OLTP databases including external data sources e.g. on the Internet.

OLAP databases are often ordered in a so-called star or snow flake scheme wherein a central primary table denoted a Fact Table is related to a number of secondary tables denoted Dimension Tables. One Fact Table is related to many Dimension Tables. A Fact Table contains the data on which calculations are based on. Data in a Fact Table contain the most detailed information. Dimension Tables contain data upon which it is desired to group calculations. Data in a table resulting from calculations based upon other tables are denoted aggregated data.

Generally, it should be noted that requested data stored in one or more tables and/or databases can be distributed on different physical systems for instance distributed on systems connected via a local area network (LAN), a wide area network (WAN), and/or the Internet. Moreover, it is a general desire to avoid having to change in applications using data in underlying database(s) when and if the physical structure of database is changed, thus providing a certain degree of independence between applications and underlying databases.

Proceedings of the ACM SIGACT-SIGMOD-SIGART Symposium on the Principles of Database Systems, 'An Overview of Query Optimization in Relational Systems' by Chaudhuri, S.; US, New York, Jun. 1, 1998, pages 23–43, ISBN: 0-89791-996-3 discloses a method of processing and optimising a query to a relational database. The disclosed method involves identifying tables which contain data specified in the query and generating a plurality of queries, involving selection of primary tables from the identified tables and incrementally selection of tables from the identified tables that is related to the primary table.

U.S. Pat. No. 5,822,747 discloses a system and a method for the determination of an optimal plan for executing an SQL query. On the basis of a query, in the form of an expression, a plurality of plans is generated from which an optimal plan is selected. The plans are generated by the use of a set of rules. The rules comprise implementation rules and transformation rules. Implementation rules are used for obtaining plans, and transformation rules are used for obtaining equivalent plans. An optimal plan is selected from the equivalent plans as a query to a relational database.

This solution, however, is inexpedient, since basically a query has to be specified which indicates the tables from which data are to be obtained.

U.S. Pat. No. 5,600,829 discloses an OLTP database system that provides some type of independence between a query and a physical structure of each database table by captioning each database table with a partial query reflecting the contents of that table. Relevant tables for a particular query may be identified by piecing together the partial queries until the user query is fulfilled. Moreover, the database system may be integrated with an optimiser.

However, this system requires that the database supports the mentioned sub-queries which clearly limits the so-called database independence. This system is basically an OLTP system which does not take into account that data in an OLAP system are stored in a redundant way. Thus, the use of sub-queries will result in an exponential number of sub-queries to the number of tables. This in turn will make it a complicated process to fulfill the user query in an efficient way.

SUMMARY OF THE INVENTION

In accordance with the present invention these problems are solved when the method mentioned initially additionally comprises generating a query for at least some of the identified tables by selecting one primary table from the identified tables and by selecting a set of tables, each table in the set being related to the primary table via N relations, and repeating this, N being varied for each repetition, until the set of tables contains the specified data, and selecting an optimal one of the generated queries.

These problems are solved when the method mentioned initially additionally comprises generating a query for at least some of the identified tables by selecting one primary table from the identified tables and by selecting a set of tables, each table in the set being related to the primary table via N relations, and repeating this, N being varied for each repetition, until the set of tables contains the specified data, and selecting an optimal one of the generated queries.

Hereby solution candidates in a number linear to the number of tables are generated. By selecting a primary table as a type of origin or centre point for investigating solution candidates only relevant solutions candidates are found. Thereby, system performance is not ruined by irrelevant solution candidates.

An optimal query may e.g. be a query which gives rise to the shortest response time when data are to be obtained from the relation base, and/or a query which gives rise to the smallest load of a system which manages control and administration of the relational database.

Expedient embodiments of the method include selecting queries from the plurality of queries by selecting the queries in which the maximum number of elements of relations to be used in order to reach the primary table from an arbitrary table in the set of tables containing the specified data, is as small as possible for the plurality of queries.

The method may further include giving each of the queries selected from the plurality of queries a neural value which, for a given query, is updated on the basis of a measurement of a response time for the given query, and selecting one query from the selected queries on the basis of a probability of selecting the query given by the neural values.

According to a further embodiment, the method includes giving each section involved in a query a weight value which weights the neural values on the basis of the influence which the section has on the response time for queries.

In each of the foregoing embodiments, the primary table can be a fact table and the set of tables can be a set of dimension tables.

The invention also relates to an apparatus for the processing of queries to a database.

Moreover, the invention relates to a computer readable medium.

BRIEF DESCRIPTION OF THE DRAWINGS

An embodiment of the invention will be described below with reference to the drawing, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
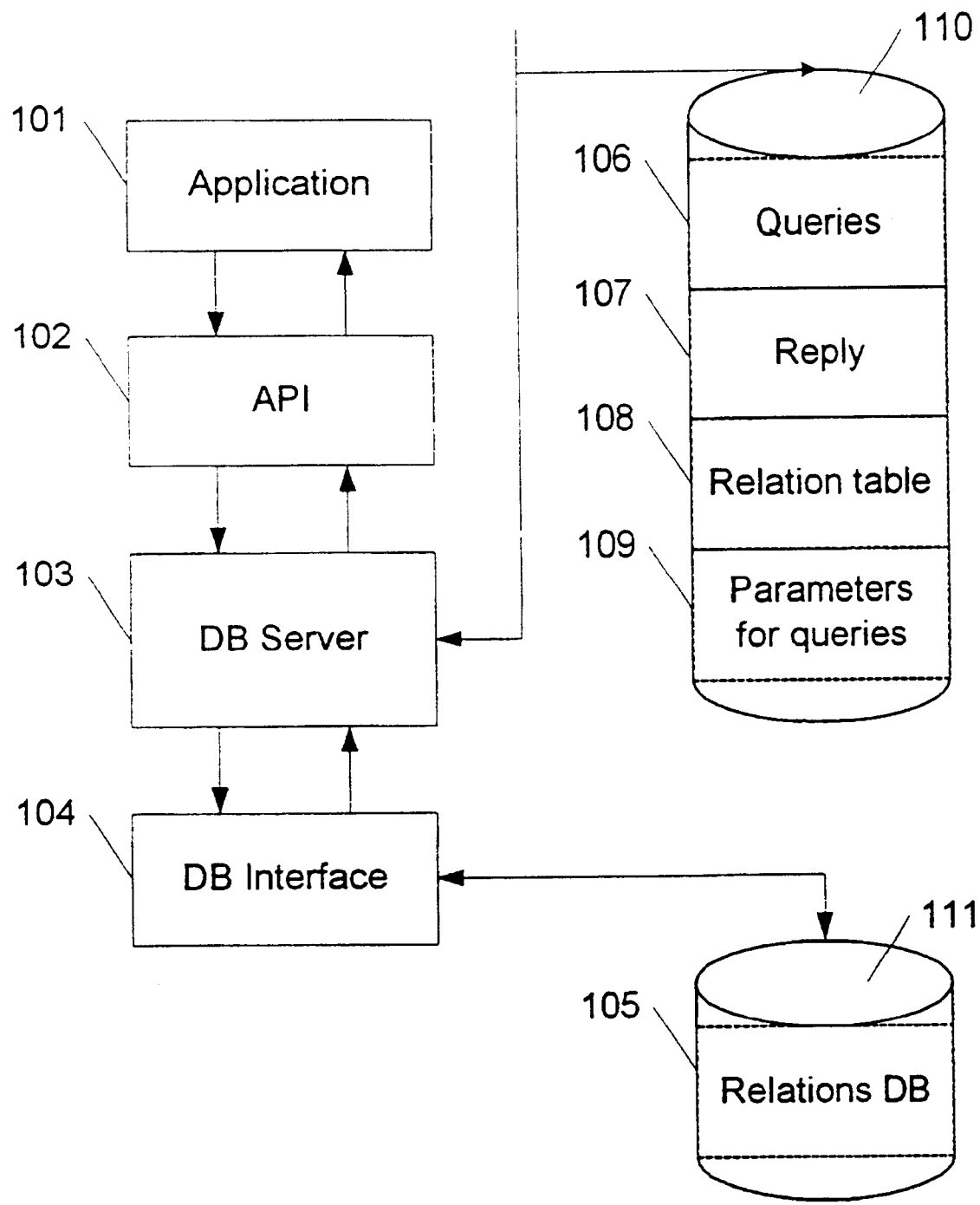
FIG. 1 shows the data flow to and from a relational database through a database server according to the invention.

FIG. 1 shows the data flow to and from a relational database through a database server according to the invention. The application 101 is adapted to service a user of the application so that the user can select data from the relational database 105 and have data represented in an expedient manner. By means of a so-called API (Application Programmable Interface) 102 the application 101 can use functions which are made available by the database server 103. Further, the application 101 and the database server 103 can exchange data via the API 102. The database server 103 can communicate with a database interface 104 which creates access to a specific relational database 105. This communication can e.g. take place according to the so-called ODBC (Open Database Connectivity) standard.

According to the invention, the database server 103 has access to information on the relational database 105 itself and information collected by examination of previous queries to the database. This information inter alia comprises parameters 109 which reflect response times for the database 105 with a given query, the type of previous queries 106 and associated replies 107. Moreover, the information comprises a table 108 with relations between sections in tables in the database 105—a so-called relation table. The information on the relational database and the relational database 105 itself are stored on a computer readable medium 110 and 111, respectively. The computer readable medium may e.g. be a hard disk, a CD-ROM, a volatile RAM or another form of medium. A connection may optionally be established to the computer readable medium via a communications connection, e.g. a local network (LAN) or a global network (WAN) such as the Internet.

The relational database 105 is first established. The relational database contains tables with sections. A relation table 108 is then made for describing the relational database, representing the type of data in the database and relations between sections/tables in the database. Then, by means of the application 101 a user may select a specific type of data which is to be represented. This takes place in that the application 101 calls one or more functions in the API 102, which then transmits a simple SQL (Structured Query Language) query to the database server 103. The simple SQL query does not necessarily contain any indication of the specific tables and sections from which data are to be obtained, but merely indicates the type of data. The database server a 103 can find an optimized query from the stored information on the relations in the database, which optimized query e.g. gives rise to the shortest response time for the requested data in the database. The optimized query is also an SQL query which now contains a specific indication of the tables which are to be used for obtaining the requested data from the database. This optimized SQL query is transmitted to the database interface 104 which then selects data from the database 105. In response to the optimized query, a reply is returned by way of a table. This table is then transmitted to the application 101 for representation. The database server, however, will take a copy of the table and store it as a reply 107 together with the associated optimized query 106 in the memory 110. Furthermore, the time it takes to obtain data is recorded. The entire method of optimizing a query will be described more fully below.

Figure 2:
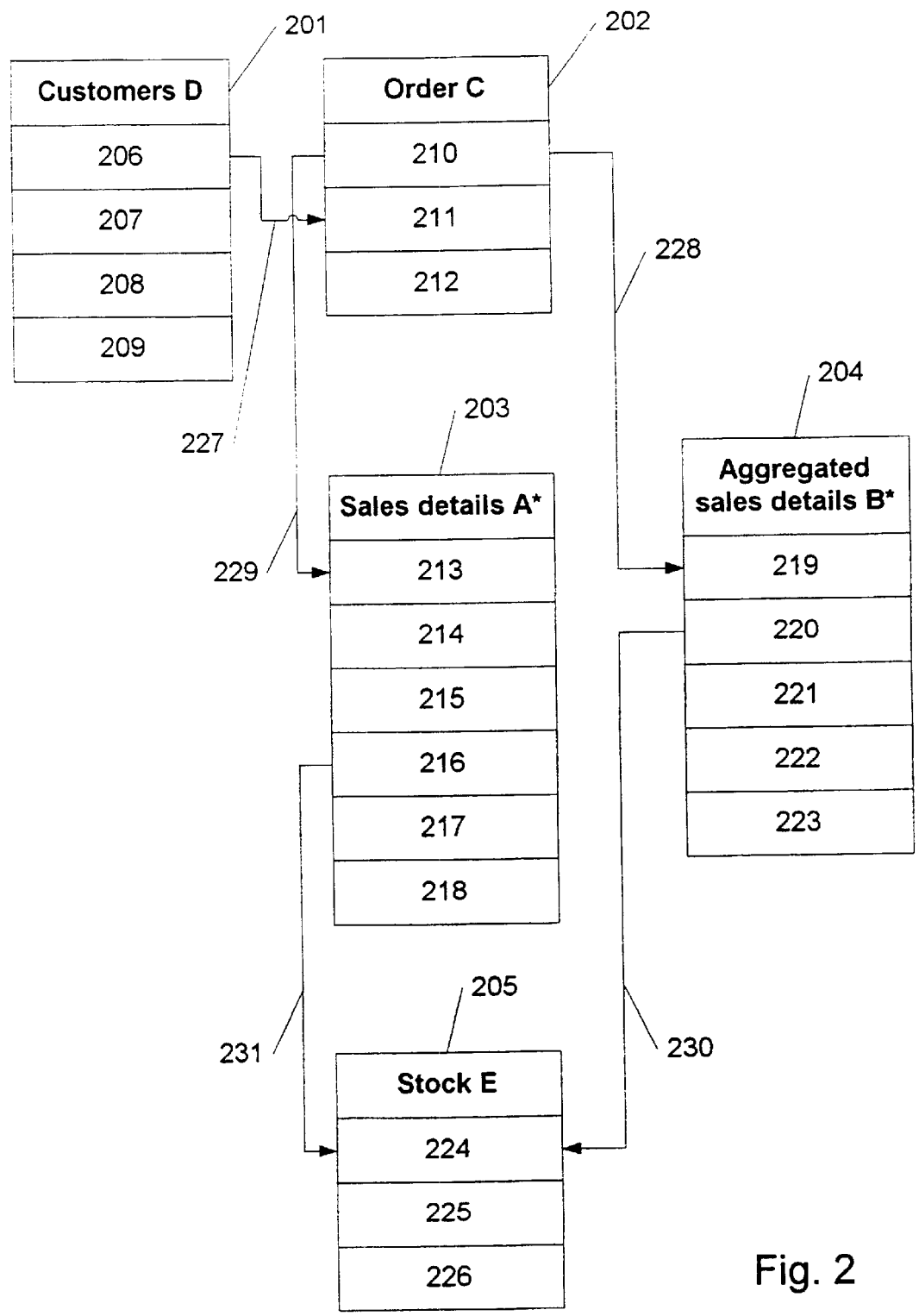
FIG. 2 schematically shows an example of a database.

FIG. 2 schematically shows an example of the structure of a database. The database structure is adapted to store information for a company which wants to record various items of information on sales, customers, etc. The database comprises a plurality of tables 201–205 which each comprise a plurality of sections 206–226. The sections are related to each other by the relations 227–231. In this example, the database contains information on customers, orders, stocks, sales details and so-called aggregated sales details. Aggregated sales details are manipulated data which may have been produced by calculating and storing data which are e.g. requested frequently. For example, sales details may be recorded per order, and in relation to monthly statements it may be expedient to calculate the sales details summed over months. Redundant data are created hereby, but the time it takes to obtain and manipulate data frequently requested, can be reduced correspondingly.

The table "Customer D" comprises information on customers in the form of the sections "Customer number" 206, "Customer name" 207, "Customer address" 208 and "Customer town" 209.

The table "Order C" comprises information on orders in the form of the sections "Invoice number" 210, "Customer number" 211 and "Salesman" 212.

The table "Sales details A*" comprises information on a sale in the form of the sections "Invoice number" 213, "Sales date" 214, "Stock number" 215, "Sales month" 216, "Sales year" 217, and "Turnover" 218.

The table "Aggregated sales details B*" comprises information on accumulated sales in the form of the sections "Invoice number" 219, "Stock number" 220, "Sales month" 221, "Sales year" 222 and "Turnover" 223.

Finally, the table "Stock E" 205 comprises information on a stock in the form of the sections "Stock number" 224, "Stock item" 225 and "Stock category" 226.

The table "Aggregated sales details" contains data from the table "Sales details" summed over months.

The tables 203 and 204 are so-called fact tables. Fact tables are tables in which calculations may be made, e.g. calculating sums, counting or, finding minimum/maximum values. The other tables 201, 202 and 205 are dimension tables, which may be used for grouping data, e.g. data may be grouped according to sales year, with a view to having turnover per sales year represented. This structure using fact and dimension tables is a typical OLAP structure.

A wish for having a reply to the question "What is the turnover per product distributed on customers in 1998?" on the basis of the database will have to be formulated in the following manner in SQL.

Select A.CustomerName, B.StockItem, sum (C.Turnover) From Customer A, Stock B, SalesDetails C, Order D Where (A.CustomerName=D.CustomerNo. and (B.StockNo.= C.StockNo.) and (C.InvoiceNo.=D.InvoiceNo.) and (C.Salesyear="1998") Group by CustomerName, StockItem.

It should be noted that all relations must be defined, and that it must be decided whether to get "Turnover" from the table "Sales details" or the table "Aggregated sales details". This is inexpedient. Represented below is a method of automatically selecting the most expedient tables for solving a question/query by identifying a plurality of solution candidates and selecting the most optimal ones of these solution candidates with a view to getting a short response time when data are to be obtained from the relation base.

Figure 3A:
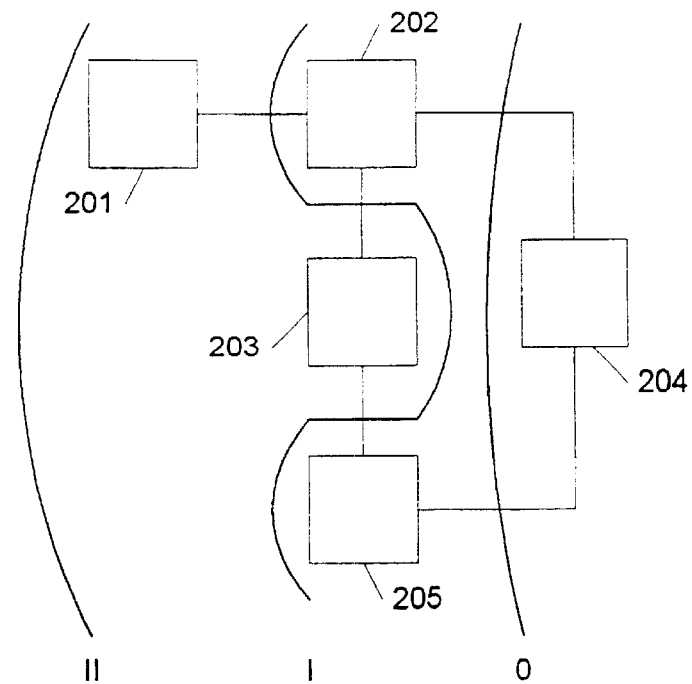
FIG. 3a shows the principle of identifying a first solution candidate.

FIG. 3*a* shows the principle of identifying a first solution candidate. The tables and sections which are to be used in order to reply to a query, must be capable of being identified automatically to release a user who is to have data represented from this task.

First, the tables containing the requested data are identified. A primary table, table 204, is selected as a first step from the identified tables. Table 204 is thereby included in a set M which is gradually expanded until the query can be answered.

Since table 204 does not contain sufficient data for answering the query, more tables must be included in the set M, i.e. the tables 202 and 205 are included in M. This content of the set M, however, is still not sufficient to be able to answer the query. The set is therefore expanded by tables 201 and 203, which allows the query to be answered with the tables in the set M.

The principle of expanding the set M is illustrated by the curves marked O, I and II.

Figure 3B:
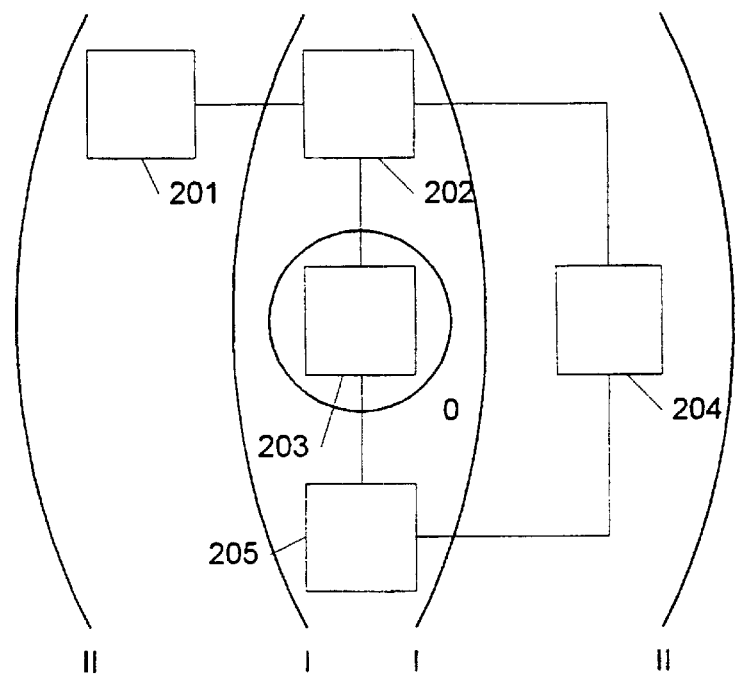
FIG. 3b shows the principle of identifying a second solution candidate.

FIG. 3*b* shows the principle of identifying a second solution candidate. In this example, the table 203 has been selected as the primary table. The table 203 is thereby included in a set M which is gradually expanded until the query can be answered.

Since table 203 does not contain sufficient data for answering the query, more tables must be included in the set M, i.e. the tables 202 and 205 are included in M. This content of the set M, however, is still not sufficient to be able to answer the query. The set is therefore expanded by the tables 201 and 204, which allows the query to be answered by the tables in the set M.

The principle of expanding the set M is illustrated by the curves marked O, I and II.

The way in which the set M is expanded follows the relations between the tables in such a manner that the number of elements of relations to be followed from a table in the set M is gradually allowed to increase.

For example, in FIG. 3*b* no relations are used for reaching the primary table when M just contains this table. Maximally one element of relations is used for reaching the primary table 203 when M comprises the tables 202 and 205. Finally, maximally two elements of relations are used for reaching the primary table 203 when M additionally comprises the tables 201 and 204. By selecting the other tables (the tables 201, 202 and 205) as a primary table and repeating the procedure, it is possible to decide which level (i.e. the maximum number of elements of relations to be used to reach the primary table) is sufficient for solving a given query. A solution is thus specified as a combination of tables and is called a solution candidate. Typically, the time it takes to obtain data with a given solution candidate will depend on the level which is used for obtaining data, i.e. how many links of relations are to be run to obtain data from a given primary table. Therefore, it will frequently be expedient to select a solution candidate with the lowest possible level when rapid access to data is desired.

Table 1 below indicates the level at which a query involving all the tables can be solved.

TABLE 1

| Primary table | Level |
| --- | --- |
| 201 | 3 |
| 202 | 2 |
| 203 | 2 |
| 204 | 2 |
| 205 | 3 |

It will thus be evident to select table 202, 203 or 204 as the primary table and to use associated solution candidates for obtaining data, i.e. for answering the query.

Table 2 below is a table describing relations between sections in tables in the database. Table 2 is used in the method which is described with reference to FIG. 3 for examining which tables are to be included in the selected set of tables.

The column "Section" in table 2 indicates the names of the various sections in the relational database 104. The columns "Table 201", "Table 202", etc. refer to the individual tables in the database (see FIG. 2), and indicate for each row in the table the reference numeral to the mutually related sections (see FIG. 2). It will be seen e.g. that the section "Invoice No." occurs in tables 202, 203 and 204, where the sections have respective reference numerals 210, 213 and 219.

TABLE 2

| Index | Section | Table 201 | Table 202 | Table 203 | Table 204 | Table 205 |
|---|---|---|---|---|---|---|
| 0 | Invoice No. | | 210 | 213 | 219 | |
| 1 | Sales date | | | 214 | | |
| 2 | Stock No. | | | 215 | 220 | 224 |
| 3 | Sales month | | | 216 | 221 | |
| 4 | Sales year | | | 217 | 222 | |
| 5 | Turnover | | | 218 | 223 | |
| 6 | Customer No. | 206 | 211 | | | |
| 7 | Salesman | | 212 | | | |
| 8 | Customer name | 207 | | | | |
| 9 | Customer address | 208 | | | | |
| 10 | Customer town | 209 | | | | |
| 11 | Stock item | | | | | 225 |
| 12 | Stock category | | | | | 226 |

The sections occurring in several tables are thus key sections and indicate relations between the tables. On the basis of table 2 it is thus possible to navigate between sections and tables in the database. It is thereby also possible to select the necessary tables which are included in the database, and which are necessary to be able to answer a given query.

Figure 4:
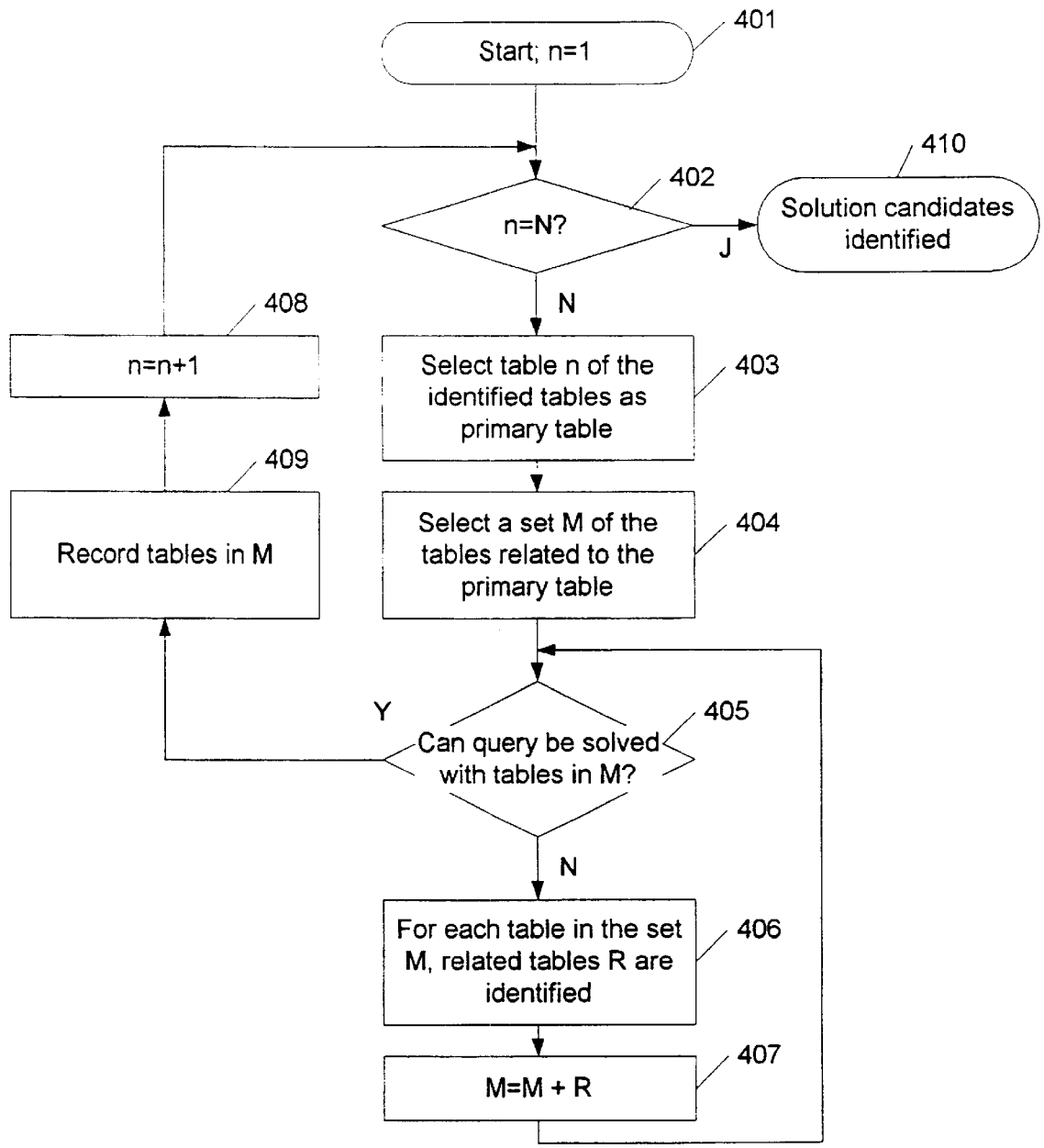
FIG. 4 shows a flow chart for identifying solution candidates.

FIG. 4 shows a flow chart for identifying solution candidates. The flow chart is a generalization of the examples in FIGS. 3a and 3b. Based on a plurality of tables identified in that they contain a part of the data requested, the algorithm starts in step 401, in which a counter n is set at the value 1. The counter n counts over the identified tables. It is tested in step 402 whether the counter has reached the number of identified tables. If this is not the case, (N), table n is selected from the identified tables as a primary table in step 403. A set of tables related to the primary table (table n) is selected by means of an associated relation table (see e.g. table 2). This is done by finding the column in the relation table corresponding to table n, followed by a search for each section in table n along rows in the relation table. The tables that contain a section corresponding to a section in the primary table are included in the set M.

It is then tested in step 405 whether the query can be solved with the tables which are included in the set M of tables. This means in practice that the entire set of requested data must be included in the set M. If the query can be solved (Y), a solution candidate has been found. Step 409 records the tables which are present in the set M and which are thereby included in the solution candidate. Then, the value of the counter n is incremented by 1, and the method returns to step 402. It is tested again in step 402 whether the counter has reached the number of identified tables—that is whether all the identified tables have been selected as a primary table.

Alternatively, if the test in step 405 indicates that the query cannot be solved with the tables in the set M (N), a set R of tables related to tables/sections in the set M of tables are identified. Thus more tables have been included in order to solve the query. In step 407 a new set M is formed as the union set of the old set M and the set R. The method then returns to step 405. The algorithm continues until all solution candidates have been identified. The algorithm is called "SQL optimization" 504, 506.

Using the algorithm in FIG. 4, the previously stated SQL query may be reduced to the following query:

Select Customer name, Stock item, sum (Turnover) From Datamodel Where Sales year="1998"

"Datamodel" is a model which allows access to the entire relational database as one virtual table. Thus, it is not necessary for the application 101 or a user of the application to specify the individual relations in the database.

Figure 5:
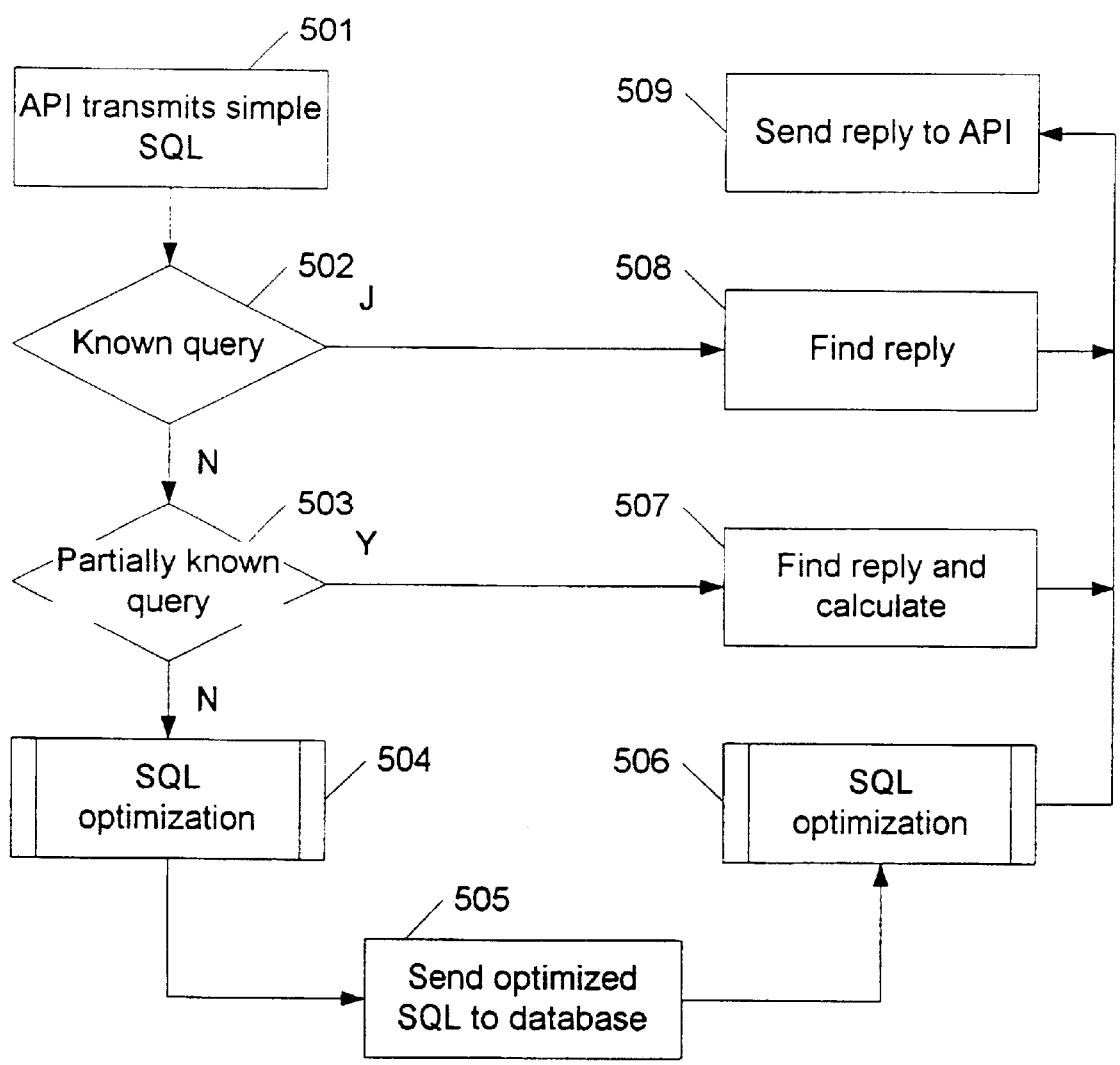
FIG. 5 shows a flow chart for handling queries to a data-base.

FIG. 5 shows a flow chart for handling queries to a database. As stated before, the application 101 can use functions made available by the server 103 by means of the API 102. Call of the functions in the API will cause a simple query, e.g. an SQL query, to be generated. This takes place in step 501. It is then decided in step 502 whether a similar query has been processed before by searching the previous queries 106.

If the query is found in the previous queries 106, an associated earlier reply 107 is obtained from the memory 110 in step.508.

Alternatively, it is decided in step 503 whether elements of a previous query can be used again. If this is the case, a table with the result of the query in the reply memory 107 is obtained in step 507, and the reply to the query is calculated from the table.

In step 504 the simple query is optimized on the basis of various criteria. In step 505 the optimized query is sent to the database interface with a view to obtaining selected data from the database.

In step 506 the information on the query and the result of the query are stored in the "query parameters" memory 109.

In step 509 the result of the query is sent to the API with a view to transfer to the application 101.

Figure 6:
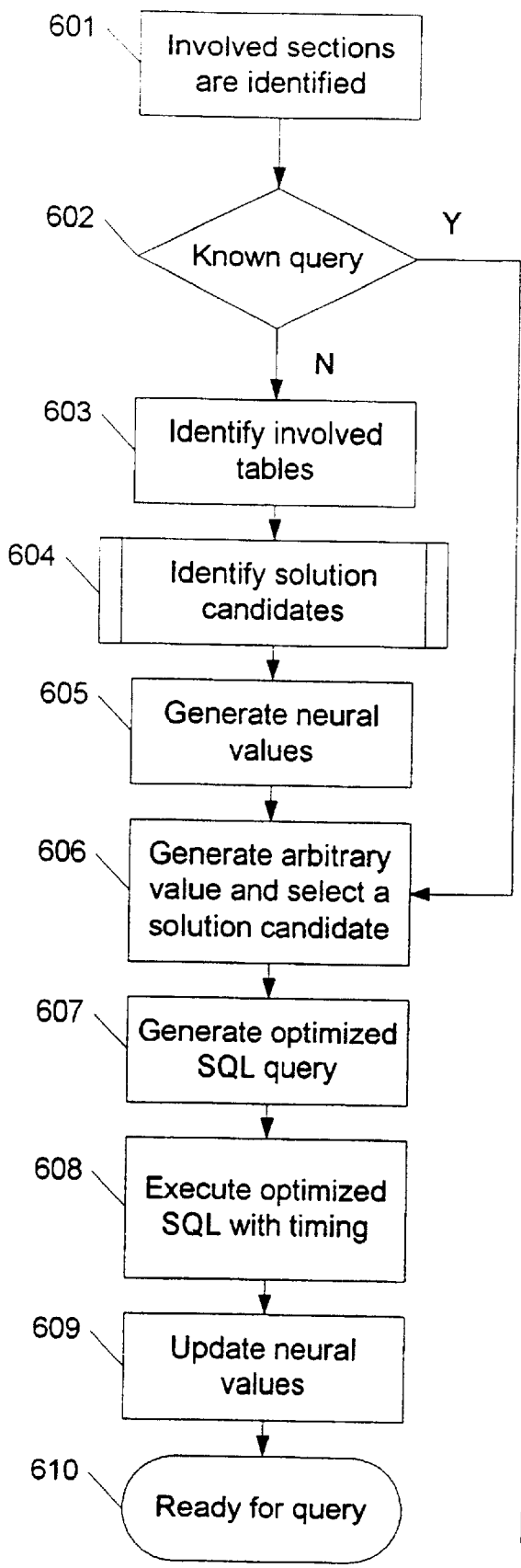
FIG. 6 shows a flow chart for optimizing queries.

FIG. 6 shows a flow chart for optimizing queries. In step 606 sections involved in a query are identified. This takes place by searching through the query to the database server and identifying section names corresponding to the data in the query which are to be represented. When the query follows the SQL standard, section names are identified under either the "select" or the "where" commands. Moreover, the query is given a unique key based on the involved sections. The key is a combination of the indices of the sections in the relation table (see table 2). A query involving the sections: Sales year, Customer name, Stock item, and Turnover, will be given the key: [4; 5; 8; 11]. This key may be stored as a query 106 in the memory 110. Finally, it is tested in step 602 whether there has been a corresponding query before, that is whether the key has already been stored in the memory. If the key is found in the memory (Y), the method continues in step 606.

Alternatively (N), if the key is not in the memory, tables involved in the query are identified in step 603. That a table is involved means that it contains one or more of the sections which were found in step 601, as described above. If a given section is found in more than one table, all the tables containing the section will be identified as candidates for being included in a solution to the query (a reply to the query).

After the tables that may be included in a solution to the query have been identified, the solution candidates requiring the smallest number of elements of relations to reach a primary table (lowest level) are identified. This is described in relation to FIGS. 3a, 3b and FIG. 4 and takes place in step 604.

In the example above, a query involving the sections: Sales year, Customer name, Stock item and Turnover got the key [4; 5; 8; 11]. However, there are more solution candidates to this query which all have a lowest level of relations (see FIG. 1). With a view to selecting the most expedient one of the solution candidates having a lowest level of relations, a neural value is allocated to each solution candidate in step 605. The neural value may be considered as a probability of a given solution candidate being selected from all the solution candidates.

The solution candidates are represented for each query in a table, such as e.g. in table 3 below.

TABLE 3

| Key | Relations | Experience | Response time | Neuron |
|---|---|---|---|---|
| 4;5;8;11; | A-C-D-E | 1 | 14 | 0.063 |
| 4;5;8;11; | A-E-D-C | 2 | 14 | 0.063 |
| 4;5;8;11; | B-C-D-E | 1 | 12 | 0.125 |
| 4;5;8;11; | C-A-E-D | 3 | 15 | 0.063 |
| 4;5;8;11; | C-D-E-A | 1 | 16 | 0.125 |
| 4;5;8;11; | C-D-E-B | 2 | 11 | 0.063 |
| 4;5;8;11; | D-C-A-E | 3 | 14 | 0.125 |
| 4;5;8;11; | D-E-A-C | 2 | 13 | 0.063 |
| 4;5;8;11; | D-E-B-C | 1 | 10 | 0.125 |
| 4;5;8;11; | E-A-C-D | 1 | 15 | 0.063 |
| 4;5;8;11; | E-B-C-D | 2 | 11 | 0.125 |
| 4;5;8;11; | E-D-C-A | 3 | 14 | 0.063 |

Table 3 comprises the columns: Key, Relations, Experience, Response time and Neuron. The column Key indicates the sections which are to be used to solve the query. The column Relations indicates the tables which are to be used to solve the query and the order in which they are included in the query. The column Experience indicates the number of times the specific query has been used for obtaining data from the database. The column Response time indicates the average time it has taken to obtain data from the database with the solution candidate, the average being calculated over the experience number.

The column Neuron indicates values which may be considered as a probability of a specific query being selected. If the response time is short for a specific query, it is given a greater value in the column Neuron, and conversely if the response time is long for a specific query, it is given a smaller value.

In step 606 an arbitrary value is generated between 0 and 1. As will appear from table 3, the sum of values in the column Neuron is 1. The server calculates the accumulated sum down through the column Neuron, and precisely when the accumulated sum exceeds the arbitrarily generated value, the associated solution candidate is selected. This solution candidate is used for obtaining data from the database. This method means that the solution candidate having the greatest value has the greatest probability of being selected.

Initially, e.g. at the installation of the database server, some values are selected in the column Neuron. A solution candidate may be given a higher value than the others, if it can immediately be evaluated to reply to the query with a shorter response time than the other solution candidates. This may be the case if the solution candidate e.g. has the smallest number of sections.

It is now known by the server from which tables the involved sections are to be obtained and which relations are to be used. This allows generation of an associated SQL query in step 607 with knowledge of the SQL syntax. An optimal query has thereby been generated in the sense that the response time for data has been reduced as much as possible.

In step 608 the SQL query is used for obtaining data from the database, and it is measured how long it takes to obtain data The value of the average response time in table 3 can thereby be updated.

In step 609 it is evaluated which effect a given section used as a criterion in a query has on the response time. For example, which effect is involved by including in the criterion that the sales year must be 1999, as stated in the SQL example above. Each section is given a so-called weight value: which is used for weighting the individual neural values. It is hereby possible to evaluate which influence the presence of a given section in a query has on the response time.

The time it takes to obtain data with a given solution candidate containing a given section is compared with the response time for all other solution candidates. If the response time for the given solution candidate is smaller than the response times for the other solution candidates on average, a greater weight value is allocated to the given section. It is hereby possible to establish an expectation of a response time without the exact response time being known from previous queries.

In step 610 the algorithm is ready for a new query.

In this way, an application according to the invention is capable of adapting itself to select an optimal query by means of the neural values. Thus, if a certain partition of a database which is used for responding to a query in an optimal way is out of order and the queried data exist in another partition in the database (i.e. redundancy), the application will be able to retrieve data from such another location without any type of administrator interaction. However, the other—redundant—data may be stored in a less optimal form. When the data used for responding to the query in the optimal way are valid again, the application will switch back to retrieve these data.

It should be noted that neural values can be in the form of different types of parameters in addition to parameters representing response time; for instance parameters representing a safety level, CPU units, money, etc.

Although relational databases have been described in the above the invention is by no means limited to relational databases, for instance XML or multidimensional databases also known as cubes can be used as a database in connection with the present invention mutatis mutandis. The query language used to query an XML database is known as XQL. In XML a collection of XML documents correspond to tables in a relational database; properties of XML documents correspond to columns; and links or relations correspond to relations. The query language used to query a multidimensional database is known as MDX. In a multidimensional database one or more cubes is arranged as fact tables.

The invention may be embodied as a computer program or a part of a computer program, which may be loaded into the memory of a computer and executed therefrom. The computer program may be distributed by means of any data storage or data transmission medium. The storage media can be magnetic tape, optical disc, compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), ferromagnetic memory, optical storage, charge coupled devices, smart cards, etc. The transmission medium can be a network, e.g. a local area network (LAN), a wide area network (WAN), or any combination thereof, e.g. the Internet. The network may comprise wire and wireless communications links. Via the network a software embodiment (i.e. a program) of the invention, or a part thereof, may be distributed by transferring a program via the network.

In a preferred embodiment, however, the invention is implemented as the type of software which is called middleware. Middleware is a designation of software which is included between a client and a server in a so-called client/server computer system.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of processing queries to a relational database stored on a computer readable medium, said computer readable medium comprising a representation of relations between tables in the database, said method comprising the steps of:

identifying tables which contain data requested by a user;

generating a plurality of queries, in that a set of primary tables is selected from the identified tables, and in that, for each primary table, a set of tables is selected which set is formed by gradually increasing the number of relations maximally used to reach, via said relations, from the primary table to any table included in the set, until the set of tables contains the data requested by the user; and selecting an optimal one of the plurality of queries by measuring a response time as the time it takes to obtain data in the relational database with a given query, and selecting the query or queries giving rise to the shortest response time as an optimal query.

2. The method according to claim 1, wherein queries from the plurality of queries are selected by selecting the queries in which the maximum number of elements of relations to be used in order to reach the primary table from an arbitrary table in the set of tables containing the specified data, is as small as possible for the plurality of queries.

3. The method according to claim 1, wherein each of the queries selected from the plurality of queries is given a neural value which, for a given query, is updated on the basis of a measurement of a response time for the given query, and one query is selected from the selected queries on the basis of a probability of selecting the query given by the neural values.

4. The method according to claim 3, wherein each section involved in a query is given a weight value which weights the neural values on the basis of the influence which the section has on the response time for queries.

5. The method according to claim 1, wherein the primary table is a fact table and the set of tables is a set of dimension tables.

6. A computer readable medium comprising a program code for performing the method defined in claim 1.

7. An apparatus for processing queries to a relational database according to the method defined in claim 1.

* * * * *